(12) United States Patent
Park et al.

(10) Patent No.: US 9,184,421 B2
(45) Date of Patent: Nov. 10, 2015

(54) POUCH-TYPE SECONDARY BATTERY HAVING SEALING MARGIN FOR IMPROVED DURABILITY

(71) Applicant: LG Chem, Ltd., Seoul (KR)

(72) Inventors: Seung-Yeob Park, Daejeon (KR); Young-Joon Shin, Daejeon (KR); Hyo-Seok Park, Daejeon (KR); Ji-Sun Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/328,866

(22) Filed: Jul. 11, 2014

(65) Prior Publication Data

US 2014/0356692 A1    Dec. 4, 2014

Related U.S. Application Data

(63) Continuation of application No. PCT/KR2013/012140, filed on Dec. 24, 2013.

(30) Foreign Application Priority Data

Dec. 24, 2012  (KR) .................. 10-2012-0151960
Dec. 24, 2013  (KR) .................. 10-2013-0162629

(51) Int. Cl.
*H01M 2/02*   (2006.01)
*H01M 2/04*   (2006.01)
(Continued)

(52) U.S. Cl.
CPC ............ *H01M 2/0207* (2013.01); *H01M 2/029* (2013.01); *H01M 2/0275* (2013.01); *H01M 2/0277* (2013.01); *H01M 2/0285* (2013.01); *H01M 10/0436* (2013.01);

(Continued)

(58) Field of Classification Search
None
See application file for complete search history.

(56) References Cited

U.S. PATENT DOCUMENTS

| 8,309,249 B2 | 11/2012 | Kobayashi et al. |
| 2013/0189570 A1 | 7/2013 | Park et al. |
| 2014/0090780 A1 | 4/2014 | Jeong |

FOREIGN PATENT DOCUMENTS

| EP | 1473785 A2 | 11/2004 |
| KR | 20120021194 A | 3/2012 |

(Continued)

OTHER PUBLICATIONS

Written Opinion of the International Searching Authority for PCT/KR2013/012140 mailed Apr. 24, 2014.

(Continued)

*Primary Examiner* — Cynthia K Walls
(74) *Attorney, Agent, or Firm* — Lerner, David, Littenberg, Krumholz & Mentlik, LLP (57) ABSTRACT

Disclosed is a pouch-type secondary battery having a sealing margin for improved durability, including a sealing area formed by melting sealing layers of an upper pouch film and a lower pouch film along edges of a pouch casing, characterized in that a sealing margin is greater than a movement distance of a sealing residue flowing out of the sealing area, the sealing margin being a distance measured from an intersection point of a first straight line and a second straight line to a boundary line of the sealing area, the first straight line extending horizontally from a surface of the sealing area, when viewed in cross section of the secondary battery, and the second straight line corresponding to a tangent line having an average gradient among possible tangent lines at each point on a cross-sectional slope line of the pouch casing adjacent to the sealing area.

13 Claims, 6 Drawing Sheets

(51) Int. Cl.
*H01M 10/04* (2006.01)
*H01M 2/06* (2006.01)
*H01M 10/052* (2010.01)
*H01M 10/0583* (2010.01)

(52) U.S. Cl.
CPC ......... *H01M 10/0463* (2013.01); *H01M 2/021* (2013.01); *H01M 2/06* (2013.01); *H01M 10/052* (2013.01); *H01M 10/0583* (2013.01); *H01M 2220/30* (2013.01); *Y02T 10/7011* (2013.01)

(56) References Cited

FOREIGN PATENT DOCUMENTS

KR  20120058960 A  6/2012
KR  20120126932 A  11/2012

OTHER PUBLICATIONS

International Search Report for PCT/KR2013/012140 mailed on Apr. 25, 2014.

POUCH-TYPE SECONDARY BATTERY HAVING SEALING MARGIN FOR IMPROVED DURABILITY

CROSS-REFERENCE TO RELATED APPLICATION

The present application is a continuation of International Application No. PCT/KR2013/012140 filed on Dec. 24, 2013, which claims priority to Korean Patent Application No. 10-2012-0151960 filed in the Republic of Korea on Dec. 24, 2012, and Korean Patent Application No. 10-2013-0162629 filed in the Republic of Korea on Dec. 24, 2013, the disclosures of which are incorporated herein by reference.

TECHNICAL FIELD

The present disclosure relates to a secondary battery, and more particularly, to a pouch-type secondary battery with improved durability by having a margin for sealing.

BACKGROUND ART

With the growing use of portable electric products such as video cameras, mobile phones, portable computers, and the like, significance of secondary batteries being mainly used as their energy sources are rapidly increasing.

A lithium secondary battery has a high energy density per unit weight and allows quick charging, when compared to other conventional secondary batteries such as a lead storage battery, a nickel-cadmium battery, a nickel-hydrogen battery, and a nickel-zinc battery, and thus, its use is on an upward trend.

As opposed to a disposable primary battery, a secondary battery is rechargeable and is being studied very actively in high-tech fields, for example, digital cameras, cellular phones, laptop computer, power tools, electric bikes, electric vehicles, hybrid vehicles, high-capacity energy storage systems, and the like.

For example, a secondary battery may include a nickel-cadmium battery, a nickel-metal hydride battery, a nickel-hydrogen battery, a lithium secondary battery, and the like. Among them, a lithium secondary battery has an operating voltage higher than or equal to 3.6V, and is used as a power source of portable electronic appliances or high output devices such as electric vehicles, hybrid vehicles, power tools, electric bikes, energy storage systems, and uninterruptible power supplies (UPS) by connecting a plurality of secondary batteries in series. A lithium secondary battery has three times higher operation voltage than that of a nickel-cadmium battery or a nickel-metal hydride battery and an excellent characteristic of energy density per unit weight, and thus, is being increasingly used.

A lithium secondary battery may be classified into a lithium ion battery using a liquid electrolyte and a lithium ion polymer battery using a solid polymer electrolyte, based on a type of an electrolyte. Also, a lithium ion polymer battery may be divided into an all-solid-state lithium ion polymer battery containing no electrolyte liquid and a lithium ion polymer battery using a gel polymer electrolyte containing an electrolyte liquid, based on a type of a solid polymer electrolyte.

A lithium ion battery using a liquid electrolyte is generally used in a shape of a cylindrical or prismatic metal can used for a container that is sealed hermetically by welding. A can-shaped secondary battery using a metal can as a container has a fixed shape, which has limitations on design of an electric product using this as a power source and its volume reduction. Accordingly, a pouch-type secondary battery fabricated by putting a cell assembly and an electrolyte into a pouch casing made from films and forming a seal has been developed and is being used.

The pouch casing is a flexible casing including a metal substrate, and has a structure in which a sealing layer made from a polymer is laminated onto a surface facing the cell assembly to be sealed by heat and pressure. Accordingly, the cell assembly is put in the pouch casing, and heat and pressure is applied along a periphery of the pouch casing to hermetically seal the pouch casing by melting the sealing layer.

Meanwhile, when sealing the pouch casing, heat and pressure is applied along the edges of the pouch casing as close as possible to the cell assembly within an allowable range. In this instance, after a sealing material constituting the sealing layer melts at a portion to which heat and pressure is applied, the sealing material flows in a direction perpendicular to a direction in which the pressure is applied, that is, a direction in which the cell assembly is disposed. Thus, usually, the melted sealing material comes in contact with the cell assembly. In this case, there is an advantage that a location of the cell assembly within the pouch casing can be securely fixed within the pouch casing. That is, the melted sealing material acts as an adhesive to fix the cell assembly. Accordingly, in case the secondary battery is used in a portable terminal such as a mobile phone or a laptop computer, durability of the secondary battery may be further improved using a flow phenomenon of the sealing material.

However, surprisingly, the Inventors of this application discovered the fact that such flow phenomenon of a sealing material is a durability degradation factor of a secondary battery depending on a usage field of the secondary battery.

That is, a sealing material solidified (hereinafter referred to as 'sealing bridge') after coming in contact with the cell assembly during sealing of the pouch casing serves as a bridge that physically connects the sealing layer of the pouch casing to the cell assembly. Accordingly, when the cell assembly waggles due to an external impact, stress is applied to an area in which the sealing bridge is formed. This stress causes cracking in the sealing layer near the sealing bridge. The resulting crack exposed through the metal substrate of the pouch casing causes a corrosion reaction of the metal substrate in the presence of the electrolyte solution, thereby resulting in life reduction of the pouch casing and insulation degradation of the pouch casing.

Accordingly, a structure for solving the problem resulting from a sealing bridge needs to be introduced to a pouch-type secondary battery used in an environment in which vibrations and impacts of various strengths are continuously applied thereto, for example, an electric vehicle or a hybrid vehicle.

DISCLOSURE

Technical Problem

The present disclosure is designed to solve the problem of the related art, and therefore, the present disclosure is directed to providing a pouch-type secondary battery having a structure of preventing a sealing layer of a pouch casing from being damaged due to a sealing bridge.

These and other objects and aspects of the present disclosure can be understood by the following description, and will become apparent from the embodiments of the present disclosure. Also, it should be understood that these and other objects and aspects of the present disclosure may be achieved by any means in the scope of the disclosure and combinations thereof.

Technical Solution

To achieve the above object, there is provided a pouch-type secondary battery in which a cell assembly is surrounded by a pouch casing including an upper pouch film and a lower pouch film each formed of at least a laminate of an outer protection layer, a metal substrate, and a sealing layer, and the pouch casing is sealed through a heat sealing process, the pouch-type secondary battery including a sealing area formed by melting the sealing layers of the upper pouch film and the lower pouch film along edges of the pouch casing, wherein a sealing margin is greater than a movement distance of a sealing residue flowing out of the sealing area, the sealing margin being a distance measured from an intersection point of a first straight line and a second straight line to a boundary line of the sealing area, the first straight line extending horizontally from a surface of the sealing area, when viewed in cross section of the secondary battery, and the second straight line corresponding to a tangent line having an average gradient among possible tangent lines at each point on a cross-sectional slope line of the pouch casing adjacent to the sealing area.

According to one aspect, the cell assembly may have a stack folding structure in which a plurality of unit cells are arranged on a separation film at a regular interval, and the separation film is folded in a predetermined direction together with the unit cells. In this case, the cell assembly may include a separation film stub at both sides along a movement direction of the sealing area.

Preferably, a location of a peak of the separation film stub is limited to a region between the intersection point and the cell assembly.

In the present disclosure, a width of the sealing area may be from 1.5 to 10 mm.

Preferably, the sealing margin may be greater than or equal to 1.5 mm, more preferably, greater than or equal to 2 mm. The wider is the sealing margin, the better is the durability of the secondary battery. The sealing margin may be as thick as the battery and less than twice a thickness of the battery in consideration of process efficiency and feasibility. Preferably, an upper limit of the sealing margin is lower than or equal to 10 mm.

According to another aspect, the pouch casing includes at least four sealing areas, and any one sealing area among the four sealing areas may have a relatively greater sealing margin than the other sealing areas. In this case, the sealing area having the relatively greater sealing margin may be located in a direction in which an electrolyte solution is injected.

In the present disclosure, the cell assembly may include a plurality of unit cells electrically separated by a separation film. Also, each unit cell includes at least a cathode plate, an anode plate, and a separator interposed between the cathode plate and the anode plate. Also, the cell assembly includes a plurality of cathode tabs and a plurality of anode tabs extending out and protruding from the cathode plate and the anode plate included in each unit cell, respectively, and a cathode lead and an anode lead joined with the plurality of cathode tabs and the plurality of anode tabs, respectively. The cell assembly may be sealed within the pouch casing such that one end of the cathode lead and one end of the anode lead are exposed to an external environment.

Preferably, a sealing tape may be interposed between the cathode and anode leads and the pouch casing.

Advantageous Effects

According to the present disclosure, there may be provided a pouch-type secondary battery with improved durability and insulation by having a sealing margin to prevent a sealing bridge formation when performing a heat sealing process along the edges of the pouch-type secondary battery.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
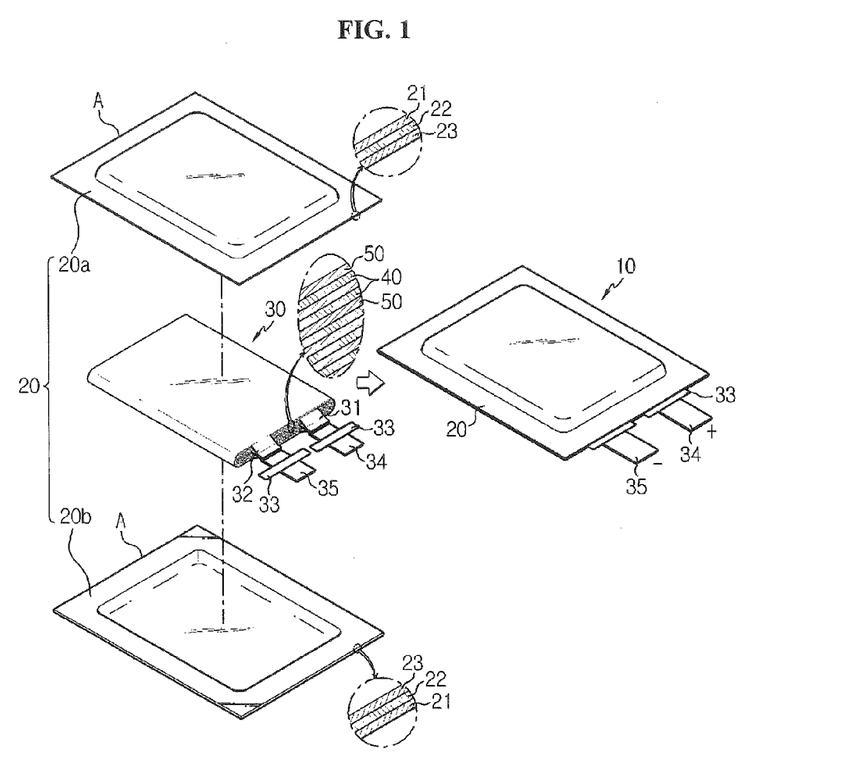
FIG. 1 is an exploded perspective view schematically illustrating a structure of a pouch-type secondary battery according to an exemplary embodiment of the present disclosure.

FIG. 1 is an exploded perspective view schematically illustrating a structure of a pouch-type secondary battery 10 according to an exemplary embodiment of the present disclosure.

Referring to FIG. 1, the pouch-type secondary battery 10 includes a pouch casing 20 and a cell assembly 30. The pouch casing 20 includes an upper pouch film 20a and a lower pouch film 20b. The cell assembly 30 is interposed between the upper pouch film 20a and the lower pouch film 20b. Also, the upper pouch film 20a and the lower pouch film 20b are sealed along their periphery by heat and pressure.

The upper pouch film 20a and the lower pouch film 20b may be separated from one another, and may be connected to one another along at least one side (for example, a side A). In FIG. 1, for convenience of description, an embodiment in which the upper pouch film 20a and the lower pouch film 20b are separated is shown.

The upper pouch film 20a and the lower pouch film 20b have a structure of an outer protection layer 21, a metal substrate 22, and a sealing layer 23 stacked in a sequential order. The outer protection layer 21 acts to prevent scratches and corrosion of the metal substrate 22, and includes at least a nylon resin layer, preferably, a nylon resin layer and a polyethyleneterephthalate resin layer. The nylon layer may be disposed adjacent to the metal substrate, and an adhesive layer may be interposed between the nylon layer and the metal substrate 22. The metal substrate 22 is not limited to a specific type if it is a flexible metal thin film, and is preferably an aluminum foil. The sealing layer 23 is not particularly limited if it is a polymer material that has an adhesive property after melting by heat, and includes at least a polyolefin-based resin layer. Preferably, the sealing layer 23 includes a cast polyolefin (CPP) resin layer, more preferably, an acid modified polyolefin (PPa) resin layer and a cast polyolefin resin layer. The acid modified polyolefin resin layer is preferably disposed adjacent to the metal substrate 22. The outer protection layer 21, the metal substrate 22, and the sealing layer 23 have a thickness in a range from several tens to several hundreds of micrometers (μm) in consideration of functions of each of them.

The present disclosure is not limited by the structure or components of the upper pouch film 20a and the lower pouch film 20b. Accordingly, it should be understood that any film falls within the scope of the upper pouch film 20a and the lower pouch film 20b if it includes the sealing layer 23 formed on a surface facing the cell assembly 30 and becoming adhesive by applying heat and pressure thereto.

The cell assembly 30 has, as a non-limiting example, a stack-folding structure. The stack-folding structure has a structure in which unit cells 40 are arranged at a regular interval on a porous insulating separation film 50 and the unit cells 40 and the separation film 50 are folded together in a predetermined direction. Since the stack-folding structure is disclosed in the Applicant's Korean Patent Publication No. 10-2008-0095967, a detailed description is omitted herein. Meanwhile, various modifications may be made to the structure of the cell assembly 30. For example, the cell assembly 30 may have a jelly roll structure. The jelly roll structure refers to a structure in which unit cells are arranged in a form of a strip and rolled up in a predetermined direction. Since the jelly roll structure is disclosed in the Applicant's Korean Patent Publication No. 10-2009-88761, a detailed description is omitted herein.

The unit cell 40 includes at least a cathode plate coated with a cathode active material, an anode plate coated with an anode active material, and a separator to electrically isolate the cathode plate from the anode plate. The cathode active material and the anode active material may be coated on any one surface or both surfaces of the cathode plate and the anode plate.

The cathode plate is mainly made from aluminum. Alternatively, the cathode plate may use stainless steel, nickel, titanium, sintered carbon, and aluminum or stainless steel treated with carbon, nickel, titanium or silver on the surface thereof. Further, any material having high conductivity while not causing a chemical change in the secondary battery may be used as the cathode plate without limitation.

A cathode tab 31 is provided at a certain area of the cathode plate, and may be made in a form of extending from the cathode plate. Alternatively, the cathode tab 31 may be formed by bonding a member of a conductive material to a predetermined area of the cathode plate by welding or the like.

The anode plate opposing the cathode plate is mainly made from copper. Alternatively, the anode plate use stainless steel, aluminum, nickel, titanium, sintered carbon, and copper or stainless steel treated with carbon, nickel, titanium or silver on the surface thereof, and aluminum-cadmium alloys may be also used.

An anode tab 32 is provided at a certain area of the anode plate, and similar to the cathode tab 31 described previously, may be made in a form of extending from the anode plate and may be bonded by a method of welding a member of a conductive material to a predetermined area of the anode plate.

As the cathode active material, lithium-containing transition metal oxide or a lithium chalcogenide compound may be used. As a representative example, metal oxide may be used, such as $LiCoO_2$, $LiNiO_2$, $LiMnO_2$, $LiMn_2O_4$, $LiFePO_4$, or $Li_{1+z}Ni_{1-x-y}Co_xM_yO_2$ ($0 \leq x \leq 1$, $0 \leq y \leq 1$, $0 \leq x+y \leq 1$, $0 \leq z \leq 1$, M represents a metal such as Al, Sr, Mg, La, and Mn).

As the anode active material, a carbon material such as crystalline carbon, amorphous carbon, a carbon composite and a carbon fiber, a lithium metal, and a lithium alloy may be used.

Since the type and chemical composition of the cathode active material and the anode active material may differ based on a type of the secondary battery, it should be understood that specific examples recited in the foregoing are merely provided for illustration.

The separator prevents a short circuit between the cathode plate and the anode plate. Also, the separator provides a path of movement of a charged particle with an electric charge, for example, a lithium ion. The separator is not limited to a specific type if it is a porous material membrane, and as a non-limiting example, may use a well-known one, for example, a polyolefin-based polymer membrane such as polypropylene and polyethylene or their multilayered membrane, a microporous film, a woven or non-woven fabric, and the like. Also, the separator may include an inorganic particle layer coated on a film used for a substrate. The inorganic particle layer includes inorganic particles combined with each other by a binder. The inorganic particles form interstitial volumes therebetween in the inorganic particle layer and maintains the pore structure of the separator in the interstitial volumes, and serves as a spacer to prevent the separator from shrinking due to heat.

The structure of the unit cell 40 is not limited to the above. Accordingly, the unit cell 40 may have a bi-cell structure of having outermost electrodes of the same polarity, or a full cell structure of having outermost electrodes of opposite polarity.

The full cell is a cell having a basic structure of cathode plate/separator/anode plate in which the cathode plate and the anode plate are disposed at the outermost of the cell. As an example of the full cell, a cell having a basic structure of cathode plate/separator/anode plate, and a cell of cathode plate/separator/anode plate/separator/cathode plate/separator/anode plate may be cited.

The bi-cell is a cell having a structure in which electrodes of the same polarity are disposed at the outermost of the cell, such as a unit structure of cathode plate/separator/anode plate/separator/cathode plate and a unit structure of anode plate/separator/cathode plate/separator/anode plate.

Meanwhile, the present disclosure is not limited to a specific structure of the cell assembly 30. Accordingly, any cell assembly structure known as being received in the pouch casing 20 may be employed as the cell assembly structure according to the present disclosure.

The cathode tab 31 and the anode tab 32 are joined with a cathode lead 34 and an anode lead 35, respectively. For procedural improvement, it is preferred to join electrode tabs having the same polarity and join the joined portions of the electrode tabs to the electrode leads. The joining between the electrode tabs or between the electrode tab and the electrode lead may be performed by a known welding method, such as resistance welding, ultrasonic welding, and laser welding, or may be performed using a conductive adhesive. A sealing tape 33 may be adhered in between the cathode lead 34 and the anode lead 35. The sealing tape 33 is provided to improve adhesion between the cathode and anode leads 34 and 35 and the pouch casing 20, and is not limited to a specific type if it is a material that can be joined, by heat fusion, with the sealing layers 23 included in the upper pouch film 20a and the lower pouch film 20b. As a non-limiting example, the sealing tape 33 may include a polyolefin resin layer, a modified polyolefin resin layer, or their multilayered membrane.

After the joining between the electrode lead and the electrode tab is completed, the cell assembly 30 is sealed within the pouch casing 20 through a sealing process. An electrolyte containing a lithium salt may be included in the pouch casing 20 to operate the secondary battery 10. The electrolyte may be any known type in the art, for example, a liquid type, a gel type, a solid type, and the like.

Figure 2:
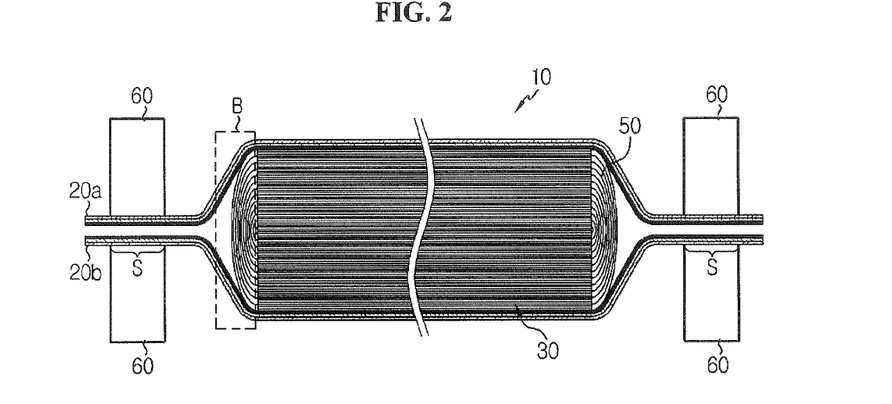
FIG. 2 is a procedural cross-sectional view illustrating a sealing process applied along edges of a pouch casing when fabricating a pouch-type secondary battery.
Figure 3:
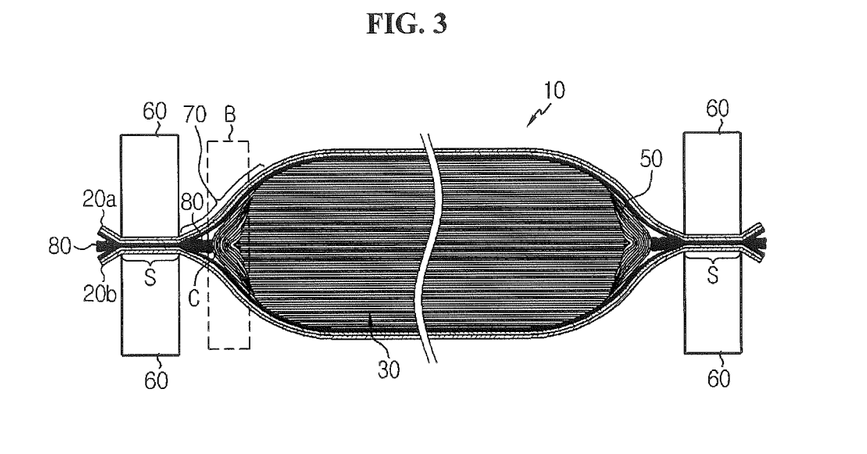
FIG. 3 is a procedural cross-sectional view illustrating a sealing process during which a sealing bridge is formed.

FIGS. 2 and 3 are procedural cross-sectional views illustrating a sealing process applied along the edges of the pouch casing 20 by heat and pressure during which a sealing bridge is formed.

Referring to FIG. 2, a process of fabricating the pouch-type secondary battery 10 includes a sealing process that applies heat and pressure along the edges of the upper pouch film 20a and the lower pouch film 20b using a sealing jig 60 with the cell assembly 30 interposed between the films 20a and 20b.

The sealing process may include a first sealing process along three sides before injecting an electrolyte solution into the pouch casing 20, and a second sealing process along remaining one side after injecting the electrolyte solution into the pouch casing 20. Various modifications may be made to the sealing process based on a point in time at which the electrolyte solution is injected and a type of the electrolyte solution. For example, when sealing is performed after the cell assembly 30 immersed in the electrolyte solution beforehand is put in the pouch casing 20, or when a type of the electrolyte solution of the secondary battery is a solid electrolyte, a double sealing process as above does not need to be performed. Accordingly, the present disclosure is not limited by a number of sealing processes or a point in time at which a sealing process starts.

Meanwhile, when the cell assembly 30 is interposed between the upper pouch film 20a and the lower pouch film 20b, a gap may occur between the upper pouch film 20a and the lower pouch film 20b. This is because a height of the cell assembly 30 is greater than a height of a space formed between the upper pouch film 20a and the lower pouch film 20b. If a gap occurs between the upper pouch film 20a and the lower pouch film 20b, the cell assembly 30 may be pressed down by the upper pouch film 20a and the lower pouch film 20b during a sealing process, as a consequence, an effect of fixing a location of the cell assembly 30 within the pouch casing 20 is produced.

Also, the cell assembly 30 includes, at the left and right sides, a separation film stub B created as a result of folding the separation film 50. The separation film stub B is pressed down by the upper pouch film 20a and the lower pouch film 20b during a sealing process. Accordingly, the separation film stub B is transformed and bulges toward a sealing portion, as shown in FIG. 3, during a sealing process.

The sealing jig 60 is a component equipped in a common sealing machine, and provides heat and pressure sufficient to at least melt and join the sealing layers 23 of the upper pouch film 20a and the lower pouch film 20b. The sealing jig 60 has a geometrical structure corresponding to desired width and length of a sealing area S, and is made from a metal having good thermal conductivity, for example, copper, stainless steel, steel, and the like.

When heat and pressure is applied to the sealing area S of the upper pouch film 20a and the lower pouch film 20b through the sealing jig 60, a seal is formed at the sealing area S by melting a constituent material of the sealing layer 23 as shown in FIG. 3. In this instance, a width of the sealing area S is set on condition that penetration of water into the pouch casing 20 can be prevented for a long time. As a non-limiting example, the sealing area S may have a width in a range of 1.5 to 10 mm.

Meanwhile, because pressure is applied to the sealing area S through the sealing jig 60 during sealing of the pouch casing 20, a sealing material flows out from the sealing area S in a direction perpendicular to a direction in which the pressure is applied. Hereinafter, the sealing material flowing out from the sealing area S is referred to as a 'sealing residue' 80. Also, during sealing of the sealing area S, the separation film stub B does not maintain its shape and is transformed because the separation film stub B is also pressed down by slop surfaces 70 of the upper pouch film 20a and the lower pouch film 20b. That is, the separation film stub B has a shape of bulging toward the sealing area S. Hereinafter, a most prominent portion of the bulged shape is referred to as a 'peak' C. Accordingly, if the sealing area S is close to the cell assembly 30, the sealing residue 80 comes into contact with the peak C of the separation film stub B, thereby causing a sealing bridge to create. Since an adverse influence of this sealing bridge on durability and insulation of the pouch casing 20 is explained in a related art, a repeated description is omitted herein.

Accordingly, the present disclosure provides a preferred location condition of the sealing area S with an aim to prevent a sealing bridge formed by the sealing residue while the pouch casing 20 is sealed through a heat sealing process.

Figure 4:
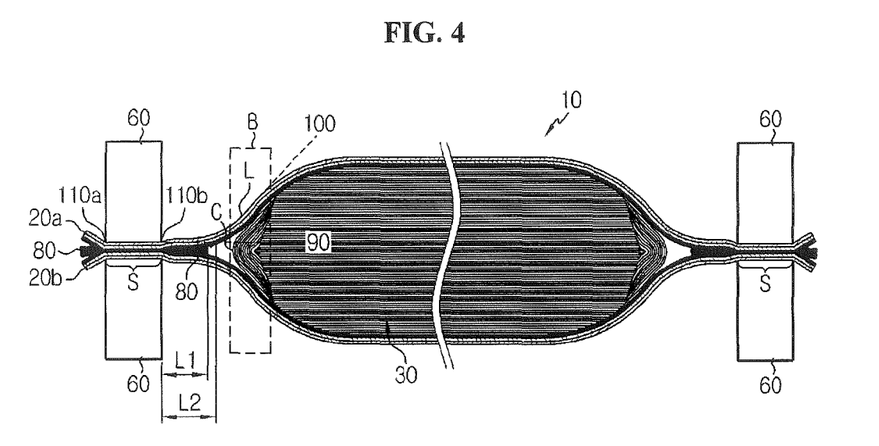
FIG. 4 is a cross-sectional view of a secondary battery with respect to a sealing area to illustrate a preferred sealing margin requirement.

FIG. 4 is a cross-sectional view of the secondary battery 10 to illustrate a preferred location requirement of the sealing area S according to an exemplary embodiment of the present disclosure.

Referring to FIG. 4, imaginary first and second straight lines 90 and 100 are indicated respectively at the sealing area S of the pouch casing 20 and a cross-sectional slope line L of the pouch casing 20 adjacent to the sealing area S when viewed in cross section. The first straight line 90 is a straight line extending parallel to an outermost surface of the sealing area S in a direction to the cell assembly 30, and the second straight line 100 is a tangent line formed at a particular point of the outermost cross-sectional slop line L of the upper pouch film 20a when viewed in cross section. Because the cross-sectional slope line L is not a straight line, the second straight line 100 may be defined as a tangent line at a point having an average gradient among gradients of tangent lines calculated at each point of the outermost cross-sectional slope line L. The first straight line 90 and the second straight line 100 meet at an intersection point, and the location of the peak C of the separation film stub B is limited to a region between the intersection point and the cell assembly 30.

Meanwhile, the sealing area S has sealing boundary lines 110a and 110b at both sides. A flow distance L1 of the sealing residue 80, in particular, flowing toward the cell assembly 30 may be calculated from the right sealing boundary line 110b located closer to the cell assembly 30. Hereinafter, unless otherwise mentioned, the sealing boundary line indicates the sealing boundary line 110b located closer to the cell assembly 30. Accordingly, when a sealing process is performed such that a distance L2 between the intersection point of the first and second straight lines 90 and 100 and the sealing boundary line 110b is larger than a flow distance of the sealing residue 80, formation of a sealing bridge may be fundamentally prevented. Hereinafter, the distance L2 is referred to as a 'sealing margin'.

The pouch-type secondary battery 10 according to the present disclosure is a result of sealing the pouch casing 20 by a heat sealing process under the above sealing condition, and is characterized in that the sealing margin L2 is larger than the flow distance L1 of the sealing residue 80.

Preferably, the sealing margin L2 is greater than or equal to 1.5 mm, more preferably, greater than or equal to 2 mm. Hereinafter, an experimental example supporting a range of the sealing margin is disclosed.

Figure 5:
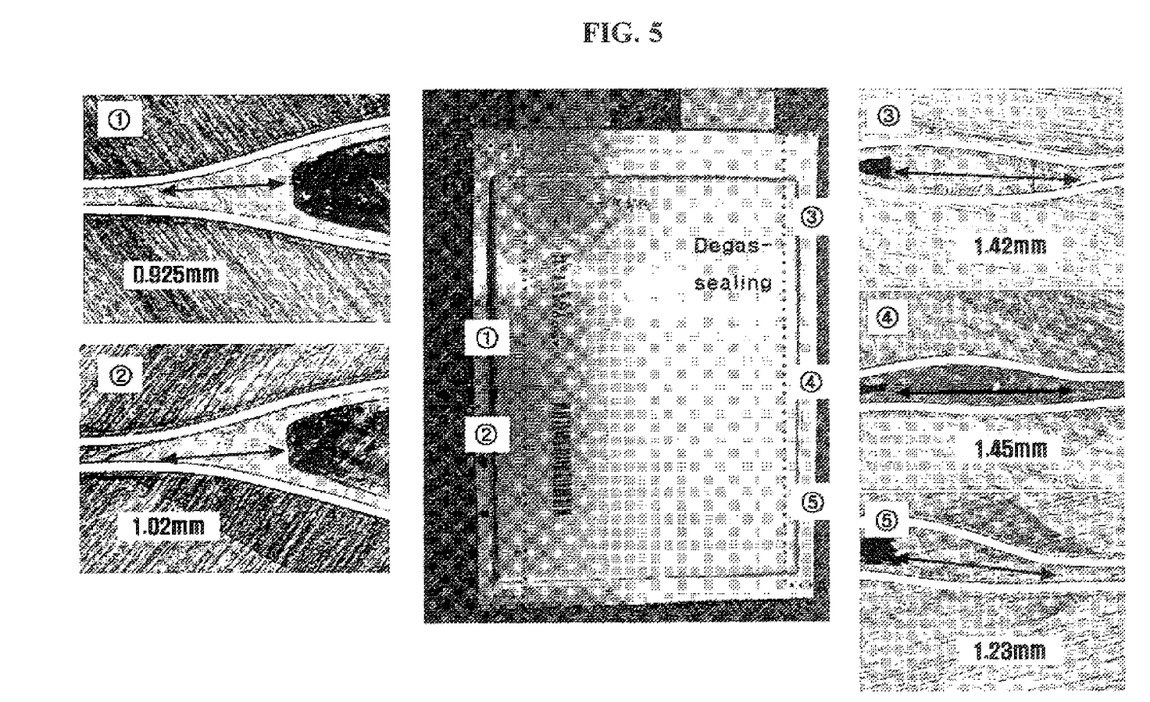
FIG. 5 is a photographic image illustrating measurement results of various flow distances of a sealing residue after manufacturing a sample of a secondary battery to set a preferred sealing margin requirement.

FIG. 5 shows enlarged photographic images of a sealing portion after peeling a pouch casing off at five points on a sealing area of a pouch-type secondary battery fabricated to estimate the preferred sealing margin L2.

When sealing the pouch casing of the secondary battery shown in the photographic images of FIG. 5, a heat sealing process was performed with almost no sealing margin. Also, the secondary battery is a battery including a liquid-type electrolyte. Accordingly, a first sealing process was performed along a left side, an upper side, and a lower side, and after injecting an electrolyte solution through an unsealed right opening of the pouch casing, a second sealing process was performed along a right side. In this instance, a width of the sealing area was set to 7.0 mm.

The photographic images presented around the photographic image of the secondary battery shown in FIG. 5 are photographic images illustrating measurement results of an extent to which the sealing residue moves after the pouch casing is locally peeled off at points ① and ② indicated at the left side of the pouch casing and points ③, ④, and ⑤ indicated at the right side. A slope surface of the pouch casing does not appear definite in the photographic images of the pouch casing peeled off at the points ③, ④, and ⑤ among the photographic images. This is because the slope surface maintaining in shape by the cell assembly 30 was transformed when the pouch casing was locally peeled off. With reference to the photographic images, it can be seen that a flow distance of the sealing residue changed from 0.925 mm to 1.45 mm. Accordingly, it can be seen that the sealing margin L2 set to be preferably greater than or equal to 1.5, more preferably, greater than or equal to 2 mm is an optimal margin. Also, because of a longer flow distance of the sealing residue in the sealing area located at the side where the electrolyte solution is injected, it can be seen that a sealing margin for the sealing area may be relatively greater than that of the other sealing area. The reason why the sealing residue in the sealing area at the side where the electrolyte solution is injected flows further is that the corresponding sealing area is subjected to a relatively higher sealing pressure than the other sealing area.

Figure 6:
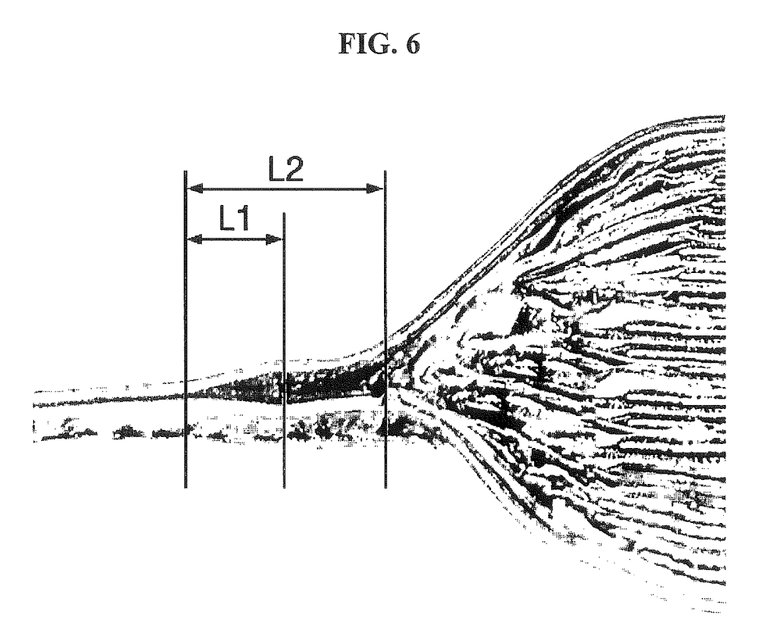
FIG. 6 is a cross-sectional photographic image of a secondary battery to illustrate that a flow distance of a sealing residue is limited within a range less than or equal to the sealing margin when a sample of the secondary battery is manufactured with a sealing margin set to 2 mm.

FIG. 6 is a cross-sectional photographic image of a pouch-type secondary battery with a pouch casing sealed by performing a heat sealing process in a state that the sealing margin L2 is set to 2 mm. For reference, the secondary battery on which the cross-sectional photographic image of FIG. 6 is taken has the same specification as the secondary battery of FIG. 5, and only has a difference in sealing margin.

Referring to FIG. 6, when the sealing margin L2 is set to 2 mm, it can be seen that a sufficient available distance is provided between the peak of the separation film stub B and the sealing residue because the flow distance L1 of the sealing residue flowing out of the sealing area is less than the sealing margin L2. From this experimental result, it can be seen that formation of a sealing bridge caused by contact of the sealing residue with the peak of the separation film stub may be fundamentally prevented when the sealing margin L2 is set to be greater than or equal to 2 mm.

Meanwhile, a preferred sealing margin condition according to the present disclosure is applied to only a sealing area at left and right sides with respect to a direction in which an electrode lead is exposed to an external environment, that is, only a sealing area facing a separation film stub of a cell assembly, and the sealing margin condition may not be applied to a sealing area at a side where the electrode lead is exposed and the opposite side thereto. When a sealing margin is great, a distance between the cell assembly and the sealing area increases, in turn, an effect that the cell assembly is pressed down by the pouch casing decreases as much. Accordingly, if a distance between the sealing area and the cell assembly is as short as possible without setting a sealing margin condition according to the present disclosure for a sealing area at the side where the electrode lead is exposed and/or the opposite side thereto, an effect that the cell assembly is pressed down by the pouch casing may be maintained. In particular, it is preferred to not apply the sealing margin condition to the opposite side to the side where the electrode lead is exposed. Here, non-application of the sealing margin condition implies that the sealing margin is less than a movement distance of a sealing residue. This sealing method provides trade-off between two advantageous effects. That is, an effect of the pouch casing fixing the cell assembly may be maintained while improving vibration safety of the secondary battery.

Hereinabove, the present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A pouch-type secondary battery in which a cell assembly is surrounded by a pouch casing including an upper pouch film and a lower pouch film each formed of at least a laminate of an outer protection layer, a metal substrate, and a sealing layer, and the pouch casing is sealed through a heat sealing process, the pouch-type secondary battery comprising:
a sealing area formed by melting the sealing layers of the upper pouch film and the lower pouch film along edges of the pouch casing,
wherein a sealing margin is greater than a movement distance of a sealing residue flowing out of the sealing area, the sealing margin being a distance measured from an intersection point of a first straight line and a second straight line to a boundary line of the sealing area, the first straight line extending horizontally from a surface of the sealing area, when viewed in cross section of the secondary battery, and the second straight line corresponding to a tangent line having an average gradient among possible tangent lines at each point on a cross-sectional slope line of the pouch casing adjacent to the sealing area.

2. The pouch-type secondary battery according to claim 1, wherein the cell assembly has a stack folding structure in which a plurality of unit cells are arranged on a separation film at a regular interval, and the separation film is folded in a predetermined direction together with the unit cells.

3. The pouch-type secondary battery according to claim 2, wherein the cell assembly includes a separation film stub at both sides along a movement direction of the sealing area.

4. The pouch-type secondary battery according to claim 3, wherein a location of a peak of the separation film stub is limited to a region between the intersection point and the cell assembly.

5. The pouch-type secondary battery according to claim 1, wherein a width of the sealing area is from 1.5 to 10 mm.

6. The pouch-type secondary battery according to claim 1, wherein the sealing margin is greater than or equal to 1.5 mm or is less than twice a thickness of the battery.

7. The pouch-type secondary battery according to claim 6, wherein the sealing margin is greater than or equal to 2 mm.

8. The cable-type secondary battery according to claim 1, wherein the pouch casing includes at least four sealing areas, and any one sealing area among the four sealing areas has a relatively greater sealing margin than the other sealing areas.

9. The cable-type secondary battery according to claim 8, wherein the sealing area having the relatively greater sealing margin is located in a direction in which an electrolyte solution is injected.

10. The cable-type secondary battery according to claim 1, wherein the cell assembly includes a plurality of unit cells electrically separated by a separation film, and each unit cell includes at least a cathode plate, an anode plate, and a separator interposed between the cathode plate and the anode plate.

11. The cable-type secondary battery according to claim 10, wherein the cell assembly includes a plurality of cathode tabs and a plurality of anode tabs extending out and protruding from the cathode plate and the anode plate included in each unit cell, respectively, and a cathode lead and an anode lead joined with the plurality of cathode tabs and the plurality of anode tabs, respectively, and the cell assembly is sealed within the pouch casing such that one end of the cathode lead and one end of the anode lead are exposed to an external environment.

12. The cable-type secondary battery according to claim 11, wherein a sealing tape is interposed between the cathode and anode leads and the pouch casing.

13. The cable-type secondary battery according to claim 11, wherein a sealing margin of a sealing area located at left and right sides with respect to a direction in which the cathode lead and the anode lead are exposed is greater than a movement distance of a sealing residue, and a sealing margin of a sealing area located at a side where the cathode lead and the anode lead is exposed and/or an opposite side to the side is less than a movement distance of a sealing residue.

* * * * *